(12) United States Patent
Jeon et al.

(10) Patent No.: US 8,386,737 B2
(45) Date of Patent: Feb. 26, 2013

(54) MEMORY DEVICES AND SYSTEMS INCLUDING WRITE LEVELING OPERATIONS AND METHODS OF PERFORMING WRITE LEVELING OPERATIONS IN MEMORY DEVICES AND SYSTEMS

(75) Inventors: Young-Jin Jeon, Hwasung (KR); Yang-Ki Kim, Hwasung (KR)

(73) Assignee: Samsung Electronics Co., Ltd. (KR)

( * ) Notice: Subject to any disclaimer, the term of this patent is extended or adjusted under 35 U.S.C. 154(b) by 766 days.

(21) Appl. No.: 12/584,937

(22) Filed: Sep. 15, 2009

(65) Prior Publication Data
US 2011/0047319 A1    Feb. 24, 2011

(30) Foreign Application Priority Data

Aug. 18, 2009 (KR) .................. 10-2009-0076368

(51) Int. Cl.
*G06F 12/00* (2006.01)
*G11C 7/00* (2006.01)
*G11C 7/10* (2006.01)

(52) U.S. Cl. ........... 711/167; 711/E12.001; 365/189.07; 365/193

(58) Field of Classification Search ............ 711/167; 365/189.07, 193
See application file for complete search history.

(56) References Cited

U.S. PATENT DOCUMENTS

| 7,050,352 B2 | 5/2006 | Cha |
| 7,580,301 B2 | 8/2009 | Cheng |
| 7,590,008 B1 * | 9/2009 | Roge et al. ............. 365/189.011 |
| 7,796,465 B2 * | 9/2010 | Swain et al. ............. 365/233.13 |
| 2003/0147299 A1 | 8/2003 | Setogawa |
| 2005/0232033 A1 | 10/2005 | Cha |
| 2007/0277071 A1 * | 11/2007 | Chong et al. .................. 714/744 |
| 2008/0056029 A1 | 3/2008 | Cheng |
| 2009/0273993 A1 * | 11/2009 | Byun ............................ 365/193 |

FOREIGN PATENT DOCUMENTS

| JP | 2003228979 | 8/2003 |
| JP | 2005310345 | 11/2005 |
| JP | 2008065804 | 3/2008 |
| KR | 1020050101858 A | 10/2005 |
| KR | 1020080022487 A | 3/2008 |

* cited by examiner

*Primary Examiner* — Charles Rones
*Assistant Examiner* — Aracelis Ruiz
(74) *Attorney, Agent, or Firm* — Onello & Mello LLP

(57) ABSTRACT

A memory device controller having a write leveling mode of operation comprises: a clock generator that generates a periodic clock signal for transmission to a memory device; a data strobe generator that generates a data strobe signal for transmission to the memory device; and a control unit that generates command signals for transmission to the memory device, the controller, during operation in the write leveling mode, generating a command signal and a write leveling control signal for transmission to the memory device.

33 Claims, 15 Drawing Sheets

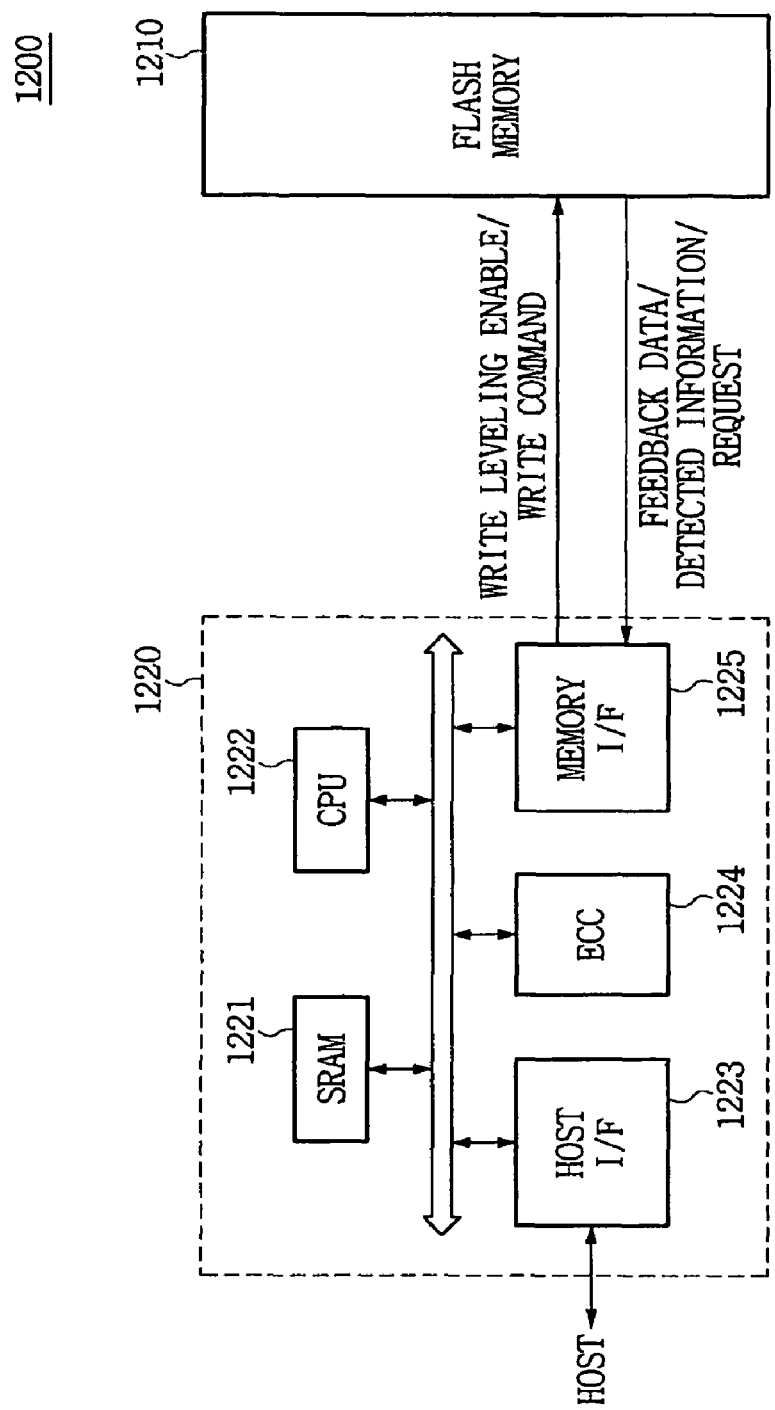

US 8,386,737 B2

MEMORY DEVICES AND SYSTEMS INCLUDING WRITE LEVELING OPERATIONS AND METHODS OF PERFORMING WRITE LEVELING OPERATIONS IN MEMORY DEVICES AND SYSTEMS

RELATED APPLICATIONS

This application claims priority under 35 U.S.C. 119 to Korean Patent Application No: 10-2009-076368, filed on Aug. 18, 2009, the content of which is incorporated herein by reference in its entirety.

BACKGROUND

With the continued emphasis on highly integrated electronic devices, there is an ongoing need for semiconductor memory devices that operate at higher speeds and lower power and that have increased device density. To accomplish this, devices with aggressive scaling and multiple-layered devices with transistor cells arranged in horizontal and vertical arrays have been under development.

As devices continue to become more aggressively scaled, the timing of the exchange of signals becomes more critical. In particular, in memory systems, arrangement of the timing of command/address signals, clock signals, and data strobe signals must be addressed as clock frequencies increase. In one example, in a memory system including a memory controller and a memory module having memory devices, the timing of signals being transferred to different memory devices on a given memory module can be different, due to a differing path length of the signal lines to each memory device on the memory module.

In particular, in contemporary memory systems, during a write operation of data signals to the memory devices, a write leveling procedure is performed to ensure that the clock signals and the data strobe signals reach each memory device on the module within a proper timing window. To perform write leveling operation, each memory chip includes its own "replica path" circuit which replicates the pathway transcended by the clock signals and the data strobe signal. A difference in phase is detected between the received clock signals and the received data strobe signal, and is transmitted to the memory controller. During a later write operation to one of the memory chips on the module, the memory controller delays the data strobe signal so that it and the clock signals reach the memory chip at the same time.

As operating frequencies continue to increase, a write leveling operation performed using a replica path is insufficient for controlling signal timing within tight timing constraints. In addition, the replica path consumes circuit area on the memory chip, which is at a premium in highly integrated devices. Further, a replica path can be wasteful of system power resources.

In addition, in contemporary systems, the phase comparison used for write leveling is made between a buffered clock signal of the clock signal received from the memory controller and the buffered data strobe signal of the data strobe signal received from the memory controller. The clock signal is periodic and continuously toggling with a predetermined duty cycle. Therefore, it is difficult to align the data strobe signal with the free-toggling clock signal, since only a half cycle (0.5 tCK, assuming the clock signal has a 50:50 duty cycle ratio) calibration margin for each direction is available for aligning them at the same rising or falling edge.

Furthermore, the amount of the skew caused by the device interface and internal circuits has a fixed value. At the same time, the clock cycle becomes smaller as operating frequencies increase. This can further introduce limitations when the conventional write leveling operation is performed.

SUMMARY

Embodiments of the present invention are directed to memory devices and systems having write leveling operations and methods of performing write leveling operations in memory devices and systems. Memory devices and systems perform a write leveling operation based on a write pulse signal that is internal to the memory device and that is synchronized with the received clock signal. In view of this, the write leveling operation can resolve timing of the data strobe signal relative to the clock signal well beyond a range of that attainable when the periodic clock signal is used as a basis for phase comparison in the write leveling operation. In addition, memory devices and systems perform a write leveling operation using a same signal path as the signal path used during a normal mode of operation such as a write operation, resolving the limitations associated with the use of a replica path for write leveling.

In one aspect, a method of controlling a memory device comprises: generating a periodic clock signal for transmission to a memory device; generating a data strobe signal for transmission to the memory device; generating a command signal and a write leveling control signal for transmission to the memory device during operation in a write leveling mode of operation of the memory device; receiving, from the memory device, a feedback signal, in response to the transmitted command signal and the transmitted data strobe signal, the feedback signal indicative of a difference in phase between the command signal and the data strobe signal, as received by the memory device, during operation in the write leveling mode of operation of the memory device; and modifying timing of the generation of the data strobe signal relative to the periodic clock signal during a write operation in a normal mode of operation of the memory device based on the feedback signal.

In one embodiment, the command signal includes a write command signal.

In another embodiment, the command signal is a pulse signal.

In another embodiment, the write leveling mode of operation is initiated during a power-up sequence mode of operation or exit from a deep power-down mode of operation.

In another embodiment, the write leveling mode of operation is initiated periodically.

In another embodiment, the write leveling mode of operation is initiated periodically by at least one of the memory device and a memory device controller controlling the memory device.

In another embodiment, the write leveling mode of operation is initiated in response to at least one of a detected change in operating temperature and a detected change in impedance factors.

In another embodiment, the write leveling mode of operation is initiated in response to at least one of a detected change in operating temperature and a detected change in impedance factors, as detected by at least one of the memory device, a memory device controller controlling the memory device, and another system connected to the memory device or the memory device controller.

In another embodiment, the method further comprises, during operation in the write leveling mode, storing timing information generated in response to the feedback signal, the timing information to be used for modification of timing of the generation of the data strobe signal relative to the clock signal during a write operation in the normal mode of operation of the memory device.

In another aspect, a write leveling method of a memory device comprises: receiving an external periodic clock signal from a memory device controller and, in response, generating an internal clock signal; receiving an external command signal from the memory device controller, and, in response, generating an internal command signal that is synchronized with the internal clock signal; receiving an external data strobe signal from the memory device controller and, in response, generating an internal data strobe signal; detecting a difference in phase between the internal command signal and the internal data strobe signal; and generating a feedback signal indicative of the difference in phase during the write leveling mode of operation.

In one embodiment, the command signal includes a write command signal.

In another embodiment, the command signal is a pulse signal.

In another embodiment, the method further comprises transmitting the feedback signal to the memory device controller.

In another embodiment, the memory device further has a normal mode of operation and the method further comprises, during operation in the normal mode of operation, generating an internal write command signal and generating an internal data strobe signal that are used for inputting external data signals from a data signal bus to the memory device, the internal write command signal and the internal data strobe signal generated during the normal mode of operation having a same signal path as the internal write command signal and the internal data strobe signal generated during the write leveling mode of operation.

In another aspect, a memory device controller has a write leveling mode of operation, the device comprising: a clock generator that generates a periodic clock signal for transmission to a memory device; a data strobe generator that generates a data strobe signal for transmission to the memory device; and a control unit that generates command signals for transmission to the memory device, the controller, during operation in the write leveling mode, generating a command signal and a write leveling control signal for transmission to the memory device.

In one embodiment, the command signal includes a write command signal.

In another embodiment, the command signal is a pulse signal.

In another embodiment, the write leveling mode of operation is initiated during a power-up sequence mode of operation or upon exit from a deep power-down mode of operation.

In another embodiment, the write leveling mode of operation is initiated periodically.

In another embodiment, the write leveling mode of operation is initiated periodically by at least one of the memory device and the memory device controller.

In another embodiment, the write leveling mode of operation is initiated in response to at least one of a detected change in operating temperature and a detected change in impedance factors.

In another embodiment, the write leveling mode of operation is initiated in response to at least one of a detected change in operating temperature and a detected change in impedance factors, as detected by at least one of the memory device, the memory device controller, and another system connected to the memory device or the memory device controller.

In another embodiment, the controller, during operation in the write leveling mode, receives a feedback signal from the memory device, in response to the transmitted command signal and the transmitted data strobe signal, the feedback signal indicative of a difference in phase between the write command signal and the data strobe signal, as received by the memory device.

In another embodiment, the controller, during operation in the write leveling mode, stores timing information generated in response to the feedback signal, the timing information to be used for modification of timing of the generation of the data strobe signal relative to the clock signal during a write operation in a normal mode of operation of the controller.

In another aspect, a memory device has a write leveling mode of operation, the device comprising: a clock buffer that receives an external periodic clock signal from a memory device controller and generates an internal clock signal; a command signal decoder that receives an external command signal from the memory device controller, and, in response, generates an internal command signal that is synchronized with the internal clock signal; a data strobe buffer that receives an external data strobe signal from the memory device controller and generates an internal data strobe signal; and a phase detector unit that detects a difference in phase between the internal command signal and the internal data strobe signal, and generates a feedback signal indicative of the difference in phase during operation in the write leveling mode of operation.

In one embodiment, the command signal includes a write command signal.

In another embodiment, the command signal is a pulse signal.

In another embodiment, the feedback signal is transmitted by the memory device to the memory device controller.

In another embodiment, the memory device further has a normal mode of operation and wherein the memory device, during operation in the normal mode of operation, generates an internal write command signal and generates an internal data strobe signal that are used for inputting external data signals from a data signal bus to the memory device, the internal write command signal and the internal data strobe signal generated during the normal mode of operation having a same signal path as the internal write command signal and the internal data strobe signal generated during the write leveling mode of operation.

In another embodiment, the write command signal is a pulse signal.

In another aspect, a memory system comprises: a memory controller that generates command and address signals; and a memory module comprising a plurality of memory devices, the memory module receiving the command and address signals and in response storing and retrieving data to and from at least one of the memory devices, wherein the memory controller has a write leveling mode of operation and comprises: a clock generator that generates a periodic clock signal for transmission to a memory device; a data strobe generator that generates a data strobe signal for transmission to the memory device; and a control unit that generates command signals for transmission to the memory device, the controller, during operation in the write leveling mode, generating a command signal and a write leveling control signal for transmission to the memory device.

In one embodiment, the command signal includes a write command signal.

In another embodiment, the command signal is a pulse signal.

BRIEF DESCRIPTION OF THE DRAWINGS

The foregoing and other objects, features and advantages of the embodiments of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention. In the drawings:

FIG. 13 is a block diagram of a memory card that includes a semiconductor device in accordance with the embodiments of the present invention.

DETAILED DESCRIPTION OF EMBODIMENTS

Embodiments of the present invention will now be described more fully hereinafter with reference to the accompanying drawings, in which preferred embodiments of the invention are shown. This invention may, however, be embodied in different forms and should not be construed as limited to the embodiments set forth herein. Like numbers refer to like elements throughout the specification.

It will be understood that, although the terms first, second, etc. are used herein to describe various elements, these elements should not be limited by these terms. These terms are used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.). When an element is referred to herein as being "over" another element, it can be over or under the other element, and either directly coupled to the other element, or intervening elements may be present, or the elements may be spaced apart by a void or gap.

The terminology used herein is for the purpose of describing particular embodiments and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
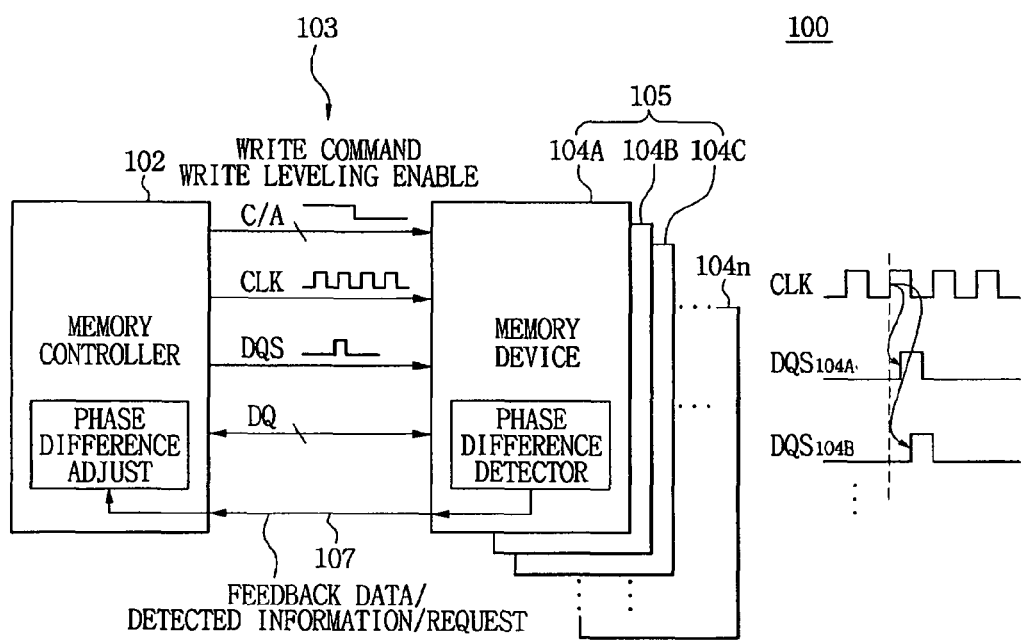
FIG. 1 is a schematic block diagram of a memory system in accordance with an embodiment of the present invention.

FIG. 1 is a schematic block diagram of a memory system in accordance with an embodiment of the present invention. A memory system 100 includes a memory controller 102 and memory module 105 which includes one or more memory devices 104A-104N. Among signals exchanged between the memory controller 102 and the memory module 105 in an input/output interface 103 are command/address signals C/A, a clock signal CLK, data bus signals DQ, and a data bus strobe signal DQS. The command/address signals C/A are generated at the controller 102 to provide instructions to the memory device and to direct the memory devices 104 to write to/read from memory locations, or addresses, during read/write operations of the memory devices 104. The signal exchange is synchronized by the clock signal CLK. Data written to and read from the memory devices is provided on the bidirectional data bus DQ, and is timed according to the data strobe signal DQS.

During a write leveling operation of one or more of the memory devices 104 by the memory controller 102, timing of the data strobe signal DQS for the memory device is determined. In the example shown, the data strobe signal DQS is received by a first memory device 104A on the module 105 as signal $DQS_{104A}$, and is received by a second memory device 104B on the module 105 as signal $DQS_{104B}$. It can be seen in the timing diagram associated with FIG. 1 that the data strobe signal DQS is received by the second memory device 104B with some delay, relative to receipt of the data strobe signal DQS by the first memory device 104A. A feedback signal 107 is generated by each memory device 104 to provide information to the controller 102 related to the relative timing of the data strobe signal. In certain embodiments, the feedback signal 107 can take the form of a specific data information signal such as an UP/DN signal that indicates to the controller the amount of adjustment that should be made to the data strobe signal to compensate for the timing of the data strobe signal DQS. In other embodiments, the feedback signal 107 can take the form of a request signal to request that the memory controller initiate a write leveling operation, for example, based on a sensed change in temperature. In other embodiments, the feedback signal 107 can request that the memory controller initiate a write leveling operation based on a detected magnitude in phase difference, or based on the passage of a certain amount of time.

In the event that the system is configured such that the controller 102 receives the specific data information as the feedback signal 107, the controller 102 can process the feedback signal 107, such as the UP/DN information, and make adjustments to the data strobe signal accordingly. In various embodiments, the feedback signal UP/DN can be a single-bit signal transmitted on its own dedicated feedback line between the memory device 104 and memory controller 102, or the feedback signal UP/DN can be a single-bit or multiple-bit signal provided on one or more lines of the data bus DQ between the memory device 104 and memory controller 102.

In the event that the system is configured such that the controller 102 receives a request signal, the controller 102 can initiate a write leveling operation at an appropriate time.

In a typical memory system, the memory controller 102 is compatible with any of a number of different types of, and any of a different number of, memory devices 104. Accordingly, at a time of power-up, the memory controller 102 communicates with the memory device by transmitting a Mode Register Set command on the command/address C/A bus. The memory device 104 responds by transmitting information to the memory controller 102 pertaining to the type, size and speed of the memory device, etc. In a conventional configuration, the memory controller 102 identifies the memory device 104 and can initiate a write leveling operation to coordinate the timing of the transfer of signals to the memory device, for example, according to the power-up and initialization sequence described in "DDR3 SDRAM Specification," July 2007, Revision 0.2, pages 1-67, the content of which is incorporated herein by reference, in its entirety.

Embodiments of the present invention provide for devices, systems, and methods by which a write leveling operation can be performed in a more efficient, effective, and accurate basis, while mitigating or eliminating certain limitations associated with the conventional approaches.

Figure 2:
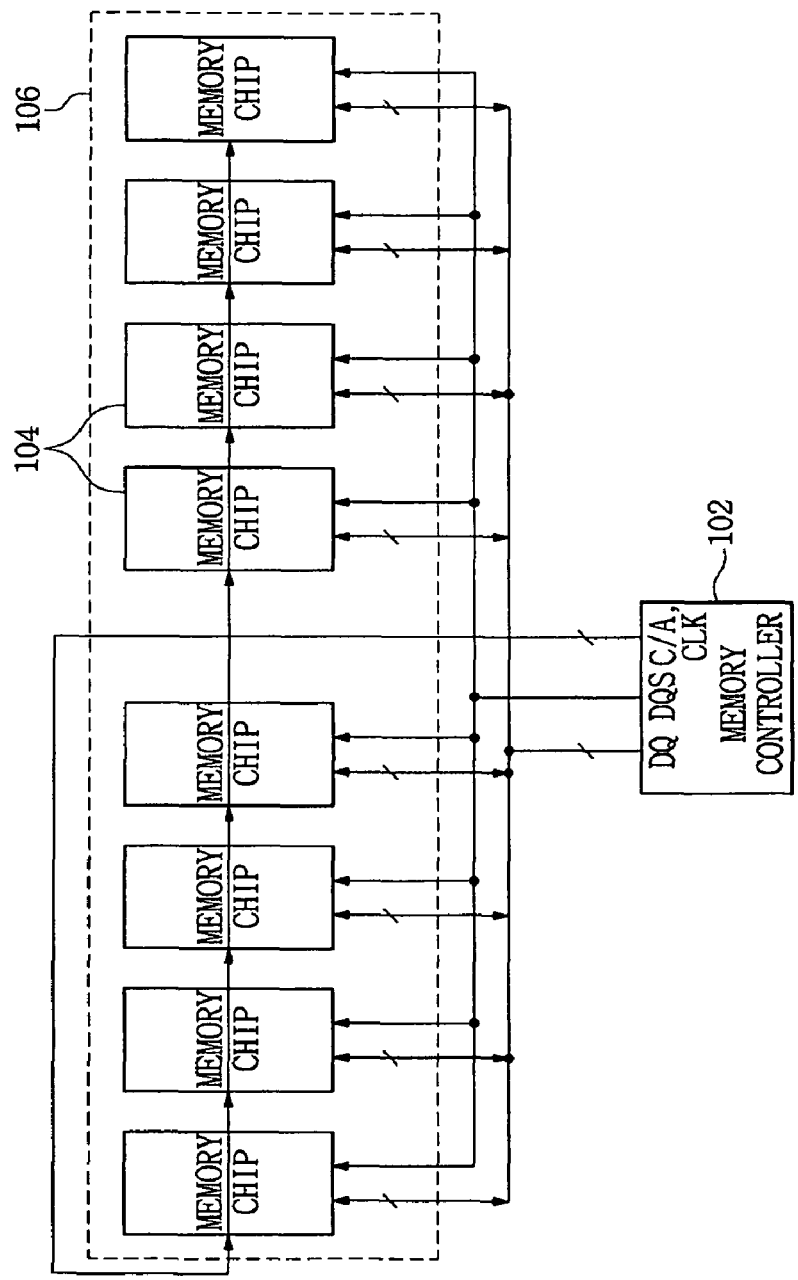
FIG. 2 is a schematic block diagram of a unbuffered-type memory module in accordance with embodiments of the present invention.

FIG. 2 is a schematic block diagram of an unbuffered-type memory module in accordance with embodiments of the present invention.

In the example memory module 106 of FIG. 2, it can be seen that the data bus signals DQ and the data bus strobe signals DQS are distributed directly between the memory controller 102 and the multiple memory devices 104 present on the memory module 104. It can also be seen, however, that the command/address signals CA and the clock signal CLK are applied first to the leftmost memory device 104 on the module 106 and next to the second leftmost memory device 104 on the module 106, and continue to propagate in this manner until they reach the rightmost memory device 104 on the module 106. This command/address C/A signal configuration is referred to in the art as a "fly-by" configuration.

It can therefore be understood in the configuration of FIG. 2 that the command/address signals CA and the clock signals will reach the leftmost memory device 104 first, followed by the second leftmost memory device 104, etc, until the signals reach the rightmost memory device 104. It therefore follows that alignment of the clock signal CLK relative to the data strobe signal DQS can be different for each memory device on the module 106. Although FIG. 2 illustrates embodiments that employ an unbuffered arrangement, the inventive concepts are equally applicable to other arrangements, including, for example, buffered arrangements.

A write leveling operation is performed by the memory controller so that the timing of the data strobe DQS signal can be adjusted relative to the clock signal CLK for each memory device 104 on the memory module 106. That way, each time a write command is later issued by the memory controller 102 on the command/address C/A bus, during a normal mode of operation of the device, the timing of the data strobe DQS signal can be appropriately adjusted, that is, advanced or delayed, depending on the memory device 104 being written to. In this manner, signal timing within operational timing constraints can be ensured in all types of memory modules 106, including modules having fly-by configurations as shown in FIG. 2

Figure 3:
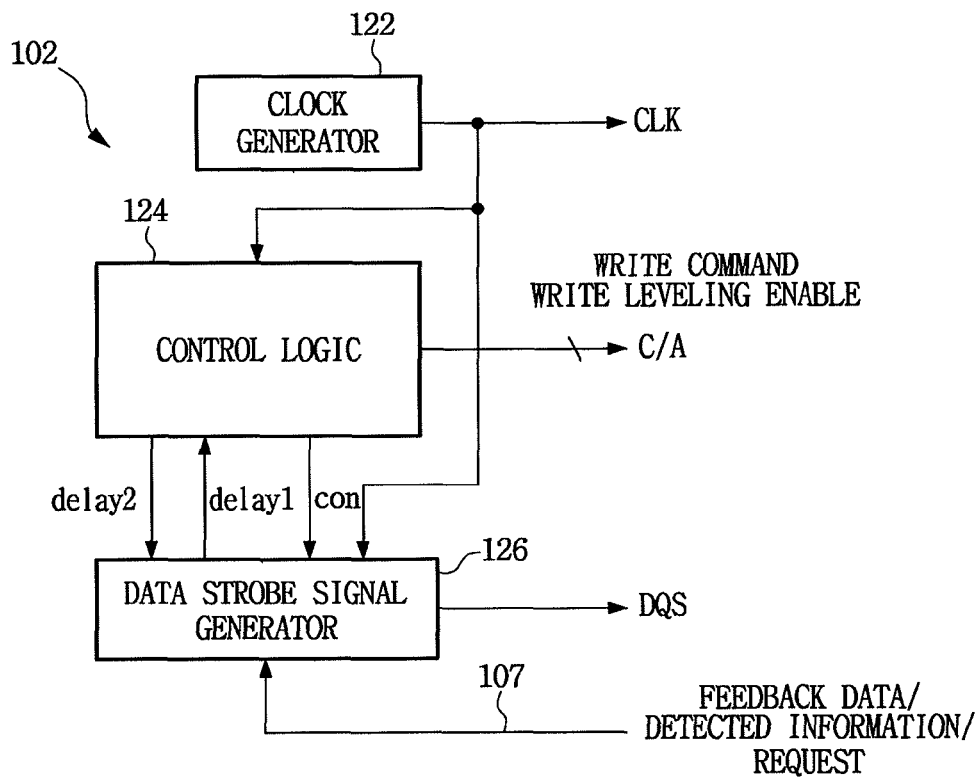
FIG. 3 is a schematic block diagram of a memory controller in accordance with an embodiment of the present invention.

FIG. 3 is a schematic block diagram of a memory controller in accordance with an embodiment of the present invention. The memory controller 102 of the embodiment of FIG. 3 includes a clock generator 122, a control logic 124 and a data strobe DQS generator 126. During operation in both a write leveling mode of operation and a normal mode of operation, the clock generator 122 generates a periodic clock signal CLK that is transmitted to the one or more memory devices 104 along the path taken by the command/address C/A bus.

The control logic 124 receives the clock signal CLK from the clock signal generator 122. During a write leveling mode of operation, the control logic 124 outputs a write leveling command on the command/address C/A bus that is synchronized with the clock signal CLK. Along with generating a write leveling command, the control logic 124 also generates a write command that is transmitted on the command/address C/A bus and is synchronized with the clock signal CLK. In response to the initiation of the write leveling operation, in one embodiment, the control logic 124 receives a feedback signal 107 that is indicative of the difference in phase between the write command signal and the data strobe signal as received by the memory device 104. The feedback signal is stored for later use by the control logic 124.

In one embodiment, the feedback signal 107 comprises an up/down UP/DN data signal that is transmitted on one or more lines of the data bus DQ from the memory device 104 to the controller 102 in response to the write leveling command. The up/down signal UP/DN is received by the data strobe generator circuit 126 and a first delay signal delay1 is in turn generated by the data strobe generator circuit 126. The first delay signal delay1 can be stored and later used by the control logic during a write operation in a normal mode of operation of the memory system. Other configurations for processing the feedback signal 107 received from the memory device are possible, and equally applicable hereto.

During a normal mode of operation, the control logic 124 outputs commands on the command/address C/A bus that are synchronized with the clock signal CLK. When the issued command involves the transmission of signals from the memory controller on the data bus DQ, the control logic determines a suitable delay amount for the data strobe signal DQS, based on the memory device 104 being written to, and provides a second delay signal delay2 to the data strobe generator. In this manner, each time a memory device 104 in the memory module 106 is to be written to, the appropriate advancement amount or delay amount is applied to the data strobe signal DQS to ensure proper operation.

The data strobe generator 126 also receives the clock signal CLK from the clock signal generator 122. During a write leveling mode of operation, the data strobe generator 126 outputs the data strobe signal DQS, for example a single pulse of the data strobe signal DQS so that a phase comparison can be performed. The data strobe generator can also receive the feedback signal 107, in this case the up/down UP/DN signal, as described above. During a normal mode of operation, the data strobe generator is responsible for applying a delay amount to the data strobe signal DQS according to the difference among memories having different skews, relative to the clock signal CLK, as determined by the second delay signal delay2 appropriate for the memory device 104 being written to.

The control signal con indicates the mode of operation. During a write leveling mode of operation, a control signal con is used to control the input and storage of the first delay signal delay1. During a normal mode of operation, the control signal con is used to control the output of the second delay signal delay2.

Figure 4:
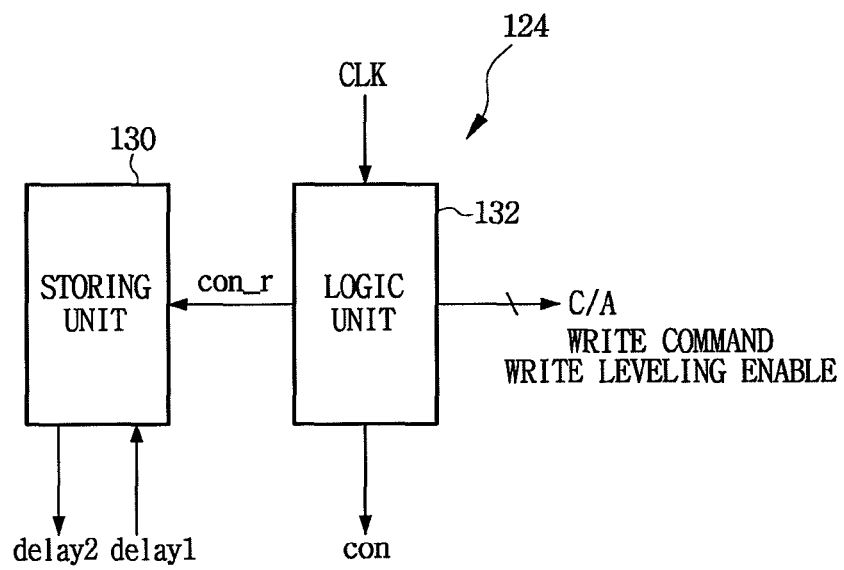
FIG. 4 is a schematic block diagram of a control logic of the memory controller of the type shown in FIG. 3 in accordance with an embodiment of the present invention.

FIG. 4 is a schematic block diagram of a control logic 124 of the memory controller 102 of the type shown in FIG. 3 in accordance with an embodiment of the present invention. In the embodiment shown, the control logic 124 includes a storing unit 130 and a logic unit 132.

During a write leveling mode of operation, the logic unit 132 outputs a write command on the command/address C/A bus that is synchronized with the clock signal CLK. The logic unit 132 also generates the control signal con described above, depending on the mode of operation of the memory controller 102, and generates the storing unit control signal con_r. The storing unit 130, during operation in the write leveling mode, operates to store the delay amount of the DQS signal for the memory device being calibrated, as indicated by the first delay signal delay1. In some example embodiments, the amount of delay to be applied to the DQS signal, and the manner for applying the delay the DQS signal can be performed in accordance with the protocol disclosed in the "DDR3 SDRAM Specification," Section 2.8 Write Leveling, July 2007, Revision 0.2, pages 24-26, incorporated herein by reference above.

During operation in the normal mode of operation, the logic unit 132 of the control logic 124 outputs commands on the command/address C/A bus that are synchronized with the clock signal CLK. In the event of a write operation to a memory device 104 in the memory system, the logic unit 132 instructs the storing unit 130 to locate and output the second delay signal delay2, to the data strobe generator 126, indicative of the delay amount to be applied to the data strobe signal DQS to be transmitted to that particular memory device 104 in the system. The logic unit 132 also transmits the control signal con to the data strobe generator 126 to control the mode of operation of the data strobe generator 126.

Figure 5A:
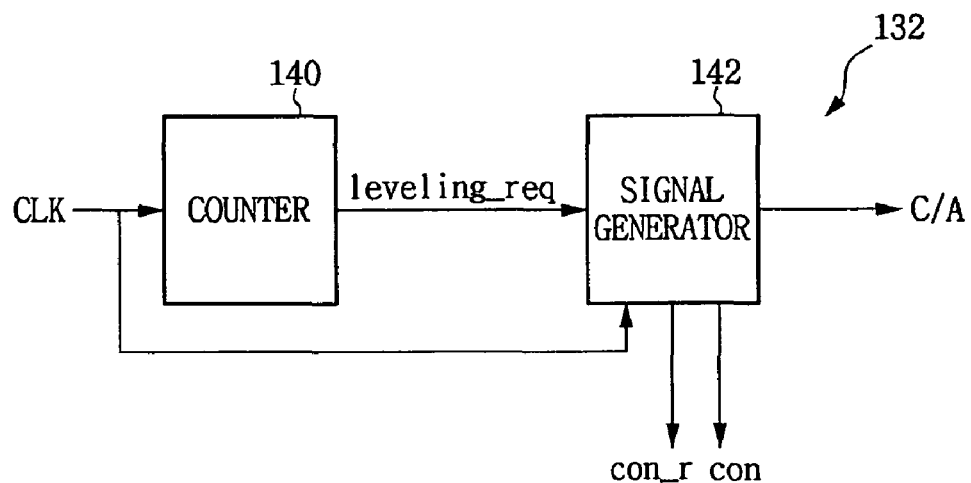
FIGS. 5A and 5B are schematic block diagrams of first and second embodiments of a logic unit of the control logic of the type shown in FIG. 4, in accordance with an embodiment of the present invention.
Figure 5B:
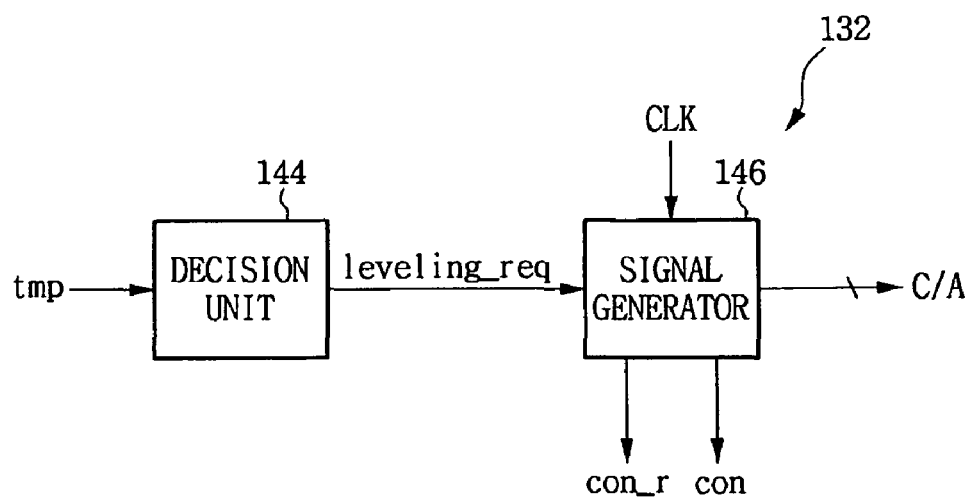

FIGS. 5A and 5B are schematic block diagrams of first and second embodiments of a logic unit 132 of the control logic 124 of the type shown in FIG. 4, in accordance with an embodiment of the present invention. These exemplary embodiments provide examples of mechanisms by which a write leveling operation can be initiated at times other than at a predetermined time, such as during a power-up sequence or at an exit from the DPD (Deep Power Down) mode of the memory device. Other embodiments for initiating a write leveling operation are equally applicable hereto.

In the embodiment of FIG. 5A, the logic unit 132 includes a counter 140 and a signal generator 142. The counter 140 receives the clock signal and periodically generates a write leveling request signal leveling_req. In response, the command signal generator 142 of the logic unit 132 outputs an appropriate command/address C/A signal that initiates a write leveling operation in the desired memory device in the system. A write command is generated in synchronization with the clock signal CLK and the write leveling operation is performed on the desired memory device.

In the embodiment of FIG. 5B, the logic unit 132 includes a decision unit 144 and a signal generator 146. The decision unit 144 receives a decision signal, for example, a temperature signal tmp indicative of the operating temperature of the memory device 104 or other related system devices, and, in response, generates a write leveling request signal leveling_req. For example, the temperature signal tmp can be generated when the operating temperature of the device reaches a threshold temperature, or the temperature signal tmp can vary with varying temperature, as supplied by a temperature sensor. In response, the command signal generator 142 of the logic unit 132 outputs an appropriate command/address C/A signal that initiates a write leveling operation in the desired memory device in the system. A write command is generated in synchronization with the clock signal CLK and the write leveling operation is performed on the desired memory device.

Figure 6:
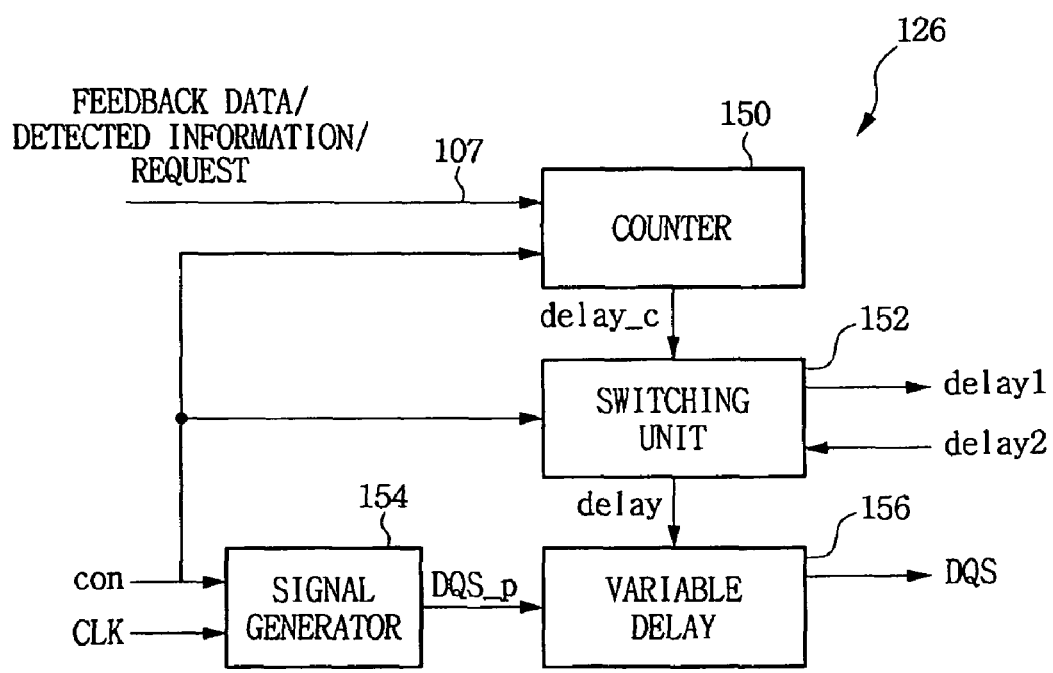
FIG. 6 is a schematic block diagram of a data strobe generator of the memory controller of the type shown in FIG. 3, in accordance with an embodiment of the present invention.

FIG. 6 is a schematic block diagram of a data strobe signal DQS generator of the memory controller of the type shown in FIG. 3 in accordance with an embodiment of the present invention. In the embodiment of FIG. 6, the data strobe signal generator 126 includes a counter 150, a switching unit 152, a signal generator 154 and a variable delay unit 156. The signal generator 154 receives the control signal con from the control logic 124 and the clock signal CLK and generates a first data strobe signal DQS_p when the control signal con calls for generation of a data strobe signal, such as during operation in a write leveling mode of operation or during a write operation in a normal mode of operation.

During a write leveling mode of operation, the counter 150 increases, counts, and outputs a delay counting signal delay_c in response to the control signal con and the feedback signal 107, for example, the up/down signal UP/DN received as the feedback signal 107 from the memory device being calibrated. The switching unit 152 receives the delay counting signal from the counter and generates one or more data strobe signal pulses for use by the recipient memory device 104 during the write leveling operation.

During a normal mode of operation, the counter 150 and switching unit 152 are inactive and the date strobe signal generator 126 generates one or more data strobe signals DQS in accordance with normal memory device protocol.

Figure 7:
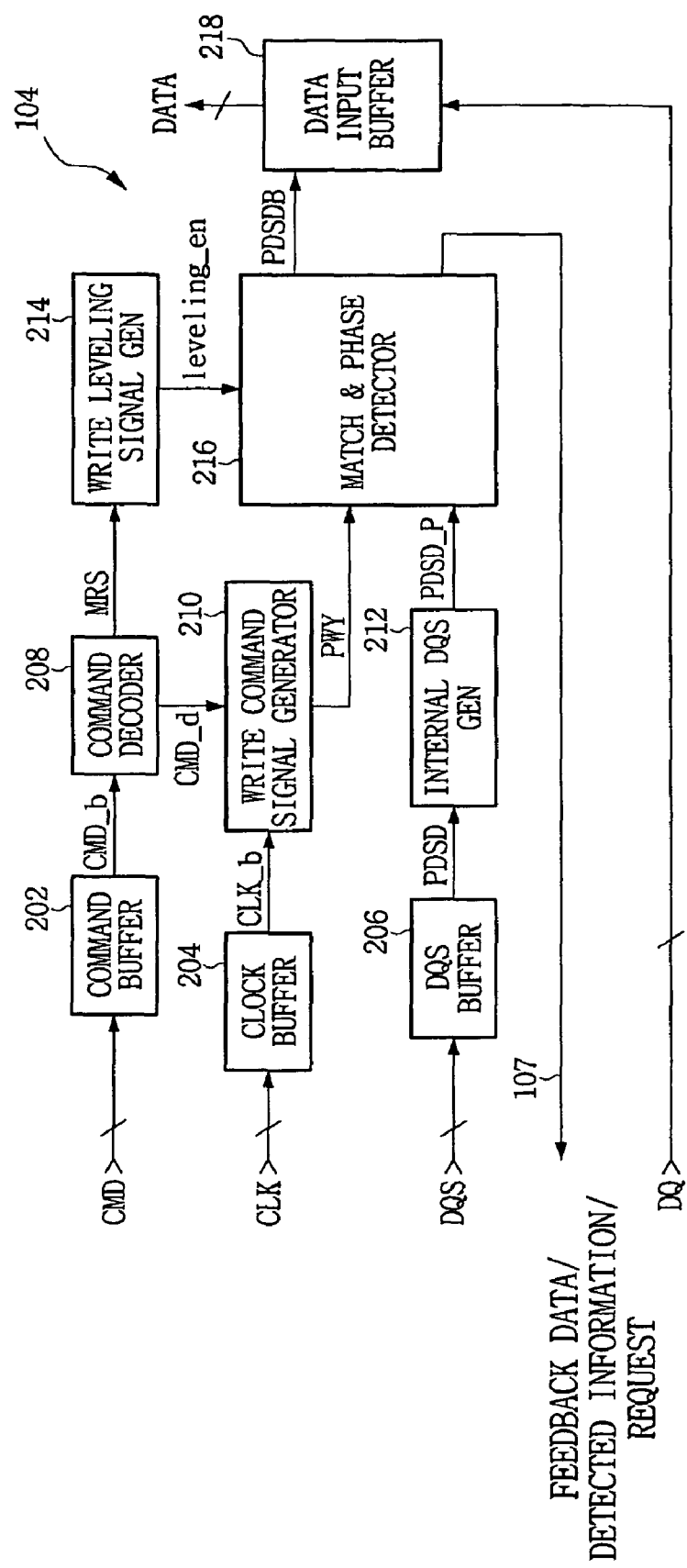
FIG. 7 is a schematic block diagram of a memory device in accordance with an embodiment of the present invention.

FIG. 7 is a schematic block diagram of a memory device in accordance with an embodiment of the present invention.

In the example embodiment of FIG. 7, a memory device 104 includes a command buffer 202 that receives a command/address signal C/A, a clock buffer 204 that receives a clock signal CLK and a data strobe buffer 206 that receives a data strobe signal DQS. The command/address signal C/A, the clock signal CLK and the data strobe signal DQS can be generated, for example, by a memory controller 102 of the type described above in connection with FIGS. 1-6.

The command buffer 202, comprises, for example, a buffer and latch combination. The resulting buffered command signal CMD_b, output by the command buffer 202, is processed by a command decoder 208 that, among other things, generates a decoded command CMD_d and a mode register set MRS signal. The mode register set MRS signal is provided to a write leveling signal generator 214, which activates a leveling enable signal leveling_en when a write leveling mode of operation is determined to be active.

The clock buffer 204 may comprise, for example, a clock repeater that applies an amount of delay that is caused by the latch in the command buffer 202 to the clock signal CLK as it passes through the clock buffer 204. The resulting buffered clock signal CLK_b, is applied to a write command generator 210.

The write command generator 210 outputs a pulsed write command signal PWY in response to the sampling of the buffered clock signal CLK_b by the decoded command signal CMD_d. The pulsed write command signal PWY is a write command signal that is delayed by a predetermined number of clock cycles in accordance with the write latency of the memory device. Therefore, delay characteristics of the delay signal PWY are programmed according to the write latency.

When a write command is initiated and decoded by the command decoder 208, then the write command signal generator 210 samples the buffered clock signal (CLK_b) according to the decoded command (CMD_d). The sampling result of the above operation is a pulsed write command PWY signal. The pulse width of the pulsed write command signal PWY can be extended to n times the clock cycle CLK by the write command signal generator 210 if the controller can accommodate the latency introduced by the extended pulse width.

For purposes of a write leveling operation, a single pulse of the pulsed write command signal PWY is sufficient for the calibration of each memory chip, but at least one preamble, or dummy, pulse can optionally be added in advance of the pulsed write command signal PWY to protect the distortion introduced by ISI(Inter Symbol Interference)

The data strobe buffer 206 buffers and delays the data strobe signal DQS to generate a buffered data strobe signal PDSD. An internal data strobe generator 212 generates a pulsed data strobe signal PDSD_p, based on the buffered data strobe signal PDSD. When the DQS signal is inactive, it, and the corresponding buffered data strobe signal PDSD signals, are in a high-Z state. The internal DQS generator places the buffered data strobe signal PDSD in a low state and then a high state, to generate a pulsed data strobe signal PDSD_p in response to the buffered data strobe signal PDSD by eliminating the high-Z state.

A match and phase detector 216, receives the leveling enable signal leveling_en, the write clock signal PWY and the pulsed data strobe signal PDSD_p. During operation in the write leveling mode of operation, as determined by the state of the leveling enable signal leveling_en, the match and phase detector 216 detects a difference in phase between the write clock signal PWY and the pulsed data strobe signal PDSD_p and generates an up/down UP/DN signal in response. As described above, the feedback signal 107, in this example, the up/down signal UP/DN can be provided to the memory controller 102 on one of the data bus DQ signal lines, or, optionally, as a separate, dedicated, signal. In this example, the up/down signal UP/DN is a feedback signal that is indicative of a difference in phase between the pulsed write command signal PWY and the pulsed data strobe signal PDSD_p, where the pulsed write command signal PWY is based on the decoded write command CMD_d synchronized with clock signal CLK as received by the memory device 104 and the pulsed data strobe signal PDSD_p is the data strobe signal DQS as received by the memory device 104.

Although embodiments of the invention described herein illustrate the generation of the pulsed write command signal PWY based on the write command signal CMD initiated by the memory controller 102, the pulsed write command signal PWY can be generated based on any of a number of command signals initiated by the memory controller 102. For example, in other embodiments, the pulsed write command signal PWY can be generated based on a read command signal, a precharge command signal, a refresh command signal, and other signals generated by the memory controller 102.

During operation in the normal mode, for example during a write operation, the match and phase detector 216 matches the data strobe signal DQS domain to the clock signal CLK domain, and generates a PDSDB signal that is used by the data input buffer 218 to clock in data received on the data bus DQ to be written to the memory cells as data.

Figure 8A:
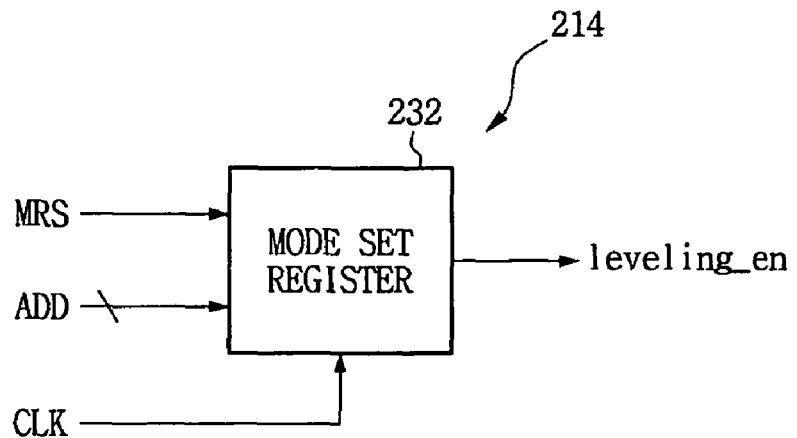
FIGS. 8A, 8B, 8C and 8D are schematic block diagrams of first, second, third and fourth embodiments of a write leveling signal generator of the memory device of the type shown in FIG. 7, in accordance with an embodiments of the present invention.
Figure 8B:
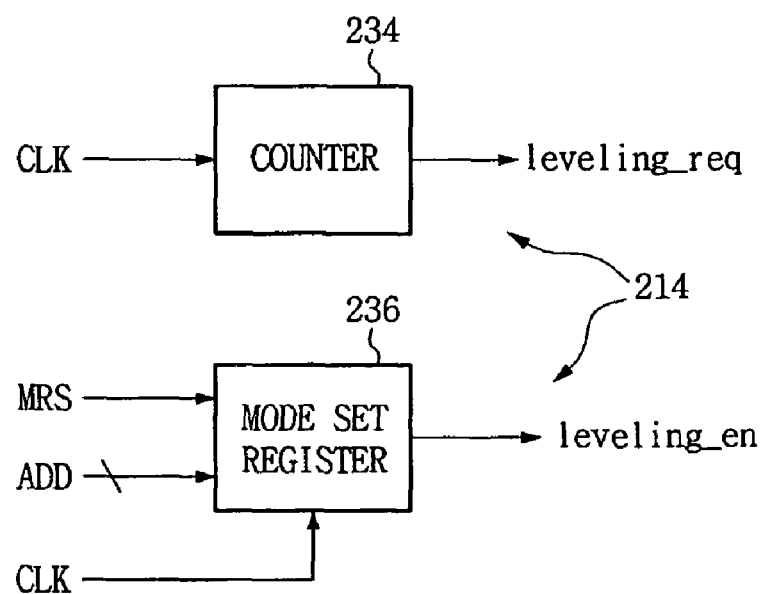
Figure 8C:
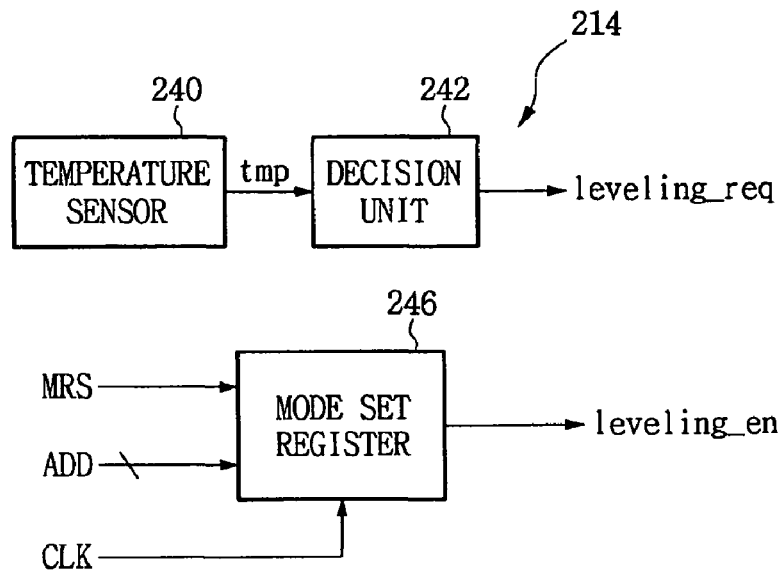
Figure 8D:
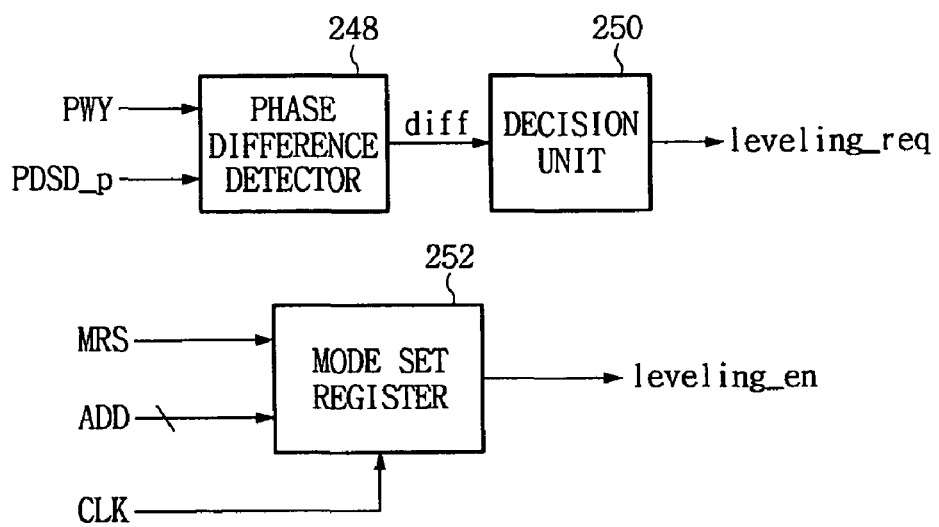

FIGS. 8A, 8B, 8C and 8D are schematic block diagrams of first, second, third and fourth embodiments of a write leveling signal generator 214 of the memory device of the type shown in FIG. 7, in accordance with an embodiments of the present invention. The embodiment of FIG. 8A is applicable to configurations where the initiation of a write leveling operation is performed by the memory controller 102. The embodiments of FIGS. 8B, 8C and 8D are applicable to configurations where the initiation of a write leveling operation is performed by the memory device 104.

Referring to FIG. 8A, in a first embodiment, the write leveling signal generator 214 comprises a mode set register 232. The mode set register 232 is set in response to an address signal ADD in accordance with the mode register set MRS, and outputs a write leveling request signal leveling_req in accordance with the set value. The write leveling request signal leveling_req can be supplied to the memory controller 102 directly, for example using an unused I/O pad, or indirectly, for example, using a flag or other output signal provided using signals transmitted via the data bus DQ. Alternatively, an auxiliary signal generator can be employed to activate the leveling enable signal leveling_en. In this case, the control logic 124 of the memory controller 102 (see FIG. 3) can be configured to generate the write command/write leveling enable signals in accordance with the write leveling request signal leveling_req Referring to FIG. 8B, in a second embodiment, the write leveling signal generator 214 comprises a mode set register 232 and a counter 234. The counter 234 can be configured through the mode set register to periodically output a write leveling request signal leveling_req by counting clock signals CLK. The write leveling request signal leveling_req can be supplied to the memory controller 102 directly, for example using an unused I/O pad, or indirectly, for example, using a flag or other output signal provided using signals transmitted via the data bus DQ. Alternatively, an auxiliary signal generator can be employed to activate the leveling enable signal leveling_en. In this case, the control logic 124 of the memory controller 102 (see FIG. 3) can be configured to generate the write command/write leveling enable signals in accordance with the write leveling request signal leveling_req Referring to FIG. 8C, in a third embodiment, the write leveling signal generator 214 comprises a temperature sensor 240 and a decision unit 242. The decision unit 242 receives a decision signal, for example, a temperature signal tmp indicative of the operating temperature of the memory device 104 from an appropriately positioned temperature sensor, and, in response, generates a write leveling request signal leveling_req, which is provided to the control logic 102 of the controller 102, as described above. For example, the temperature signal tmp can be generated when the operating temperature of the device reaches a threshold temperature, or can vary with varying temperature, as supplied by a temperature sensor. At the same time, the mode set register 246 can be configured to output a leveling enable signal leveling_en, in accordance with the address ADD signal. The leveling enable signal leveling_en, signal is provided to the match and phase detector 216 of the memory device (see FIG. 7).

Referring to FIG. 8D, in a fourth embodiment, the write leveling signal generator 214 comprises a phase difference detector 248 and a decision unit 250. The decision unit 250 receives a difference signal diff indicative of a difference in phase between the write clock signal PWY and the pulsed data strobe signal PDSD_p, where the write clock signal PWY is based on write command synchronized with the clock signal CLK as received by the memory device 104 and the pulsed data strobe signal PDSD_p is the data strobe signal DQS as received by the memory device 104. In one embodiment, the phase difference detector comprises a counter. In response, for example, to a difference in phase that exceeds a threshold value, the decision unit 250 generates a write leveling request signal leveling_req. At the same time, the mode set register 246 can be configured to output a leveling enable signal leveling_en, in accordance with the address ADD signal. The leveling enable signal leveling_en, signal is provided to the match and phase detector 216 of the memory device (see FIG. 7).

In the various embodiments described above, the memory controller 102 can be configured to output an appropriate command/address C/A signal for setting the mode set register 232, 236, 246, 252 with an appropriate value. Also, as explained herein, the write leveling operation can alternatively or additionally be initiated during a power-up sequence or upon exit from a deep power down mode. Therefore, the write leveling signal generator can also be configured to output a write leveling request signal leveling_req at these times to initiate the operation.

Figure 9A:
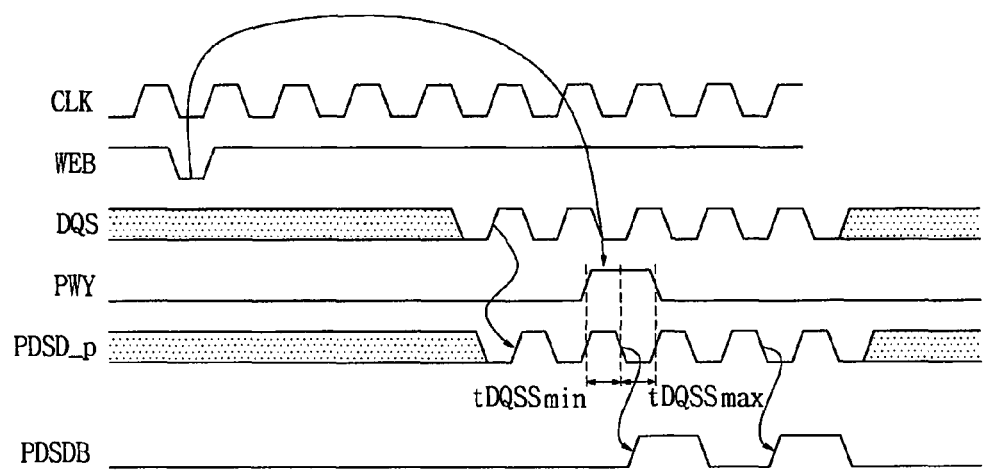
FIGS. 9A and 9B are timing diagrams of signals active in the memory device of the type shown in FIG. 7, during a normal write operation and during a write leveling operation, respectively, in accordance with embodiments of the present invention.
Figure 9B:
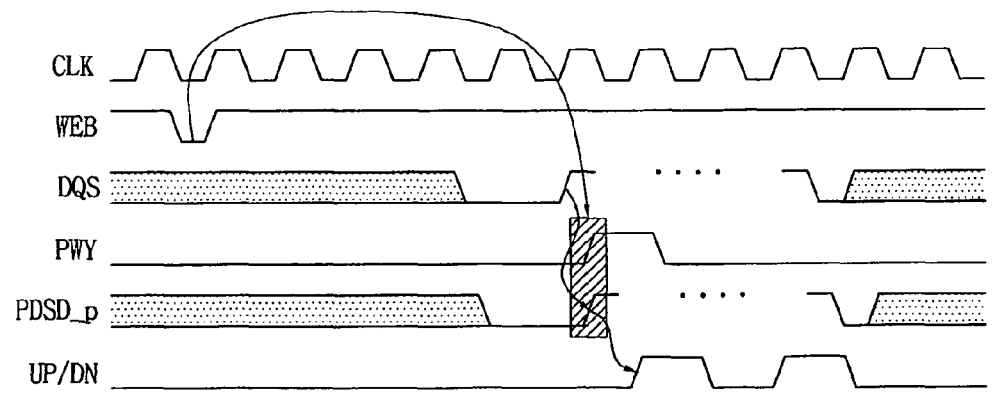
Figure 10A:
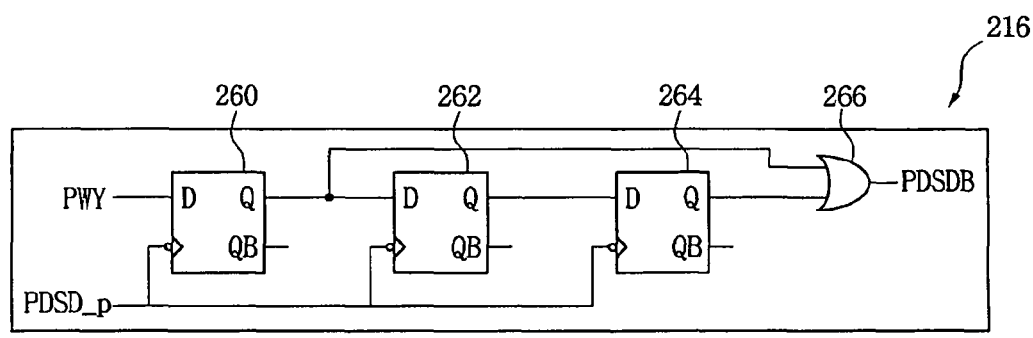
FIGS. 10A and 10B are schematic diagrams of an embodiment of the match and phase detector of the memory device of the type shown in FIG. 7, in accordance with an embodiment of the present invention.
Figure 10B:
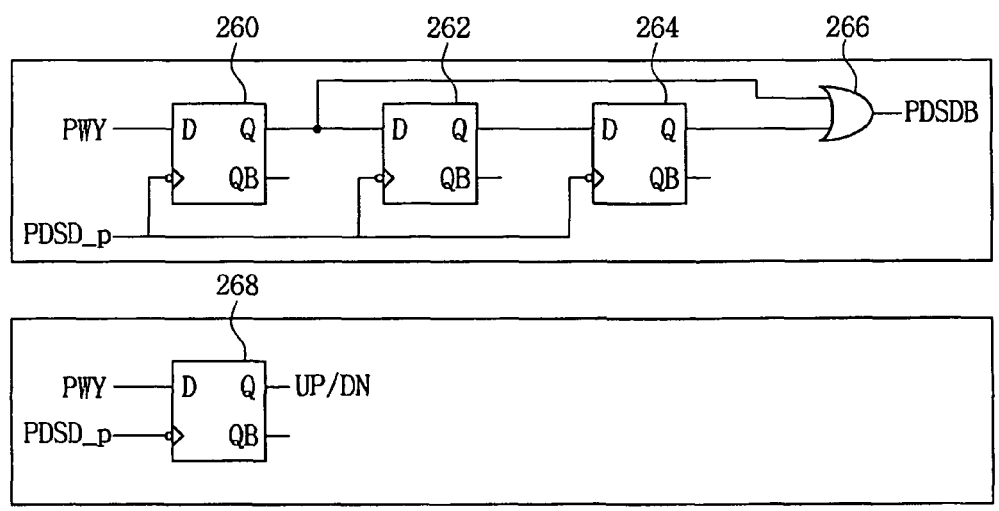

FIGS. 9A and 9B are timing diagrams of signals active in the memory device of the type shown in FIG. 7, during a normal write operation and during a write leveling operation, respectively, in accordance with embodiments of the present invention. FIGS. 10A and 10B are schematic diagrams of an embodiment of the match and phase detector of the memory device of the type shown in FIG. 7, in accordance with an embodiment of the present invention.

Referring to FIGS. 9A and 10A, during operation in a normal mode of operation, for example when a write command is issued by the memory controller, the memory device receives an external clock signal CLK, an external write enable signal WEB and an external data strobe signal DQS. In one embodiment, the external write enable signal WEB is a designated one of the lines of the command/address bus C/A between the controller 102 and the memory device 104 or memory module 105.

The write enable signal WEB is sampled by the write command signal generator 210 as described above in connection with FIG. 7 to generate the pulsed write command signal PWY. At the same time, an internal pulsed data strobe signal PDSD_p is generated, based on the received external data strobe signal DQS, as described above.

Referring to FIG. 10A, the pulsed write command signal PWY is latched by the falling edge of the pulsed data strobe signal PDSD_p so that the resulting PDSDB data clock signal is properly aligned with the center of the write command signal PWY. As described above, the PDSDB data clock signal is used by the data input buffer 218 to clock in data received on the data bus DQ to be written to the memory cells. In the above example, a five (5) clock cycle latency is applied, which is why there is a five clock cycle delay between the activation of the write enable signal WEB and the generation of the pulsed write command signal PWY.

Referring to FIGS. 9B and 10B, during operation in a write leveling mode of operation, the memory device receives an external clock signal CLK, an external write enable signal WEB and an external data strobe signal DQS. As described above, in one embodiment, the external write enable signal WEB is a designated one of the lines of the command/address bus C/A between the controller 102 and the memory device 104 or memory module 105

The write enable signal WEB is sampled by the write clock generator 210 as described above in connection with FIG. 7 to generate the pulsed write clock signal PWY. At the same time, an internal pulsed data strobe signal PDSD_p is generated, based on the received external data strobe signal DQS, as described above.

Referring to FIG. 10B, the pulsed write clock signal PWY and the internal pulsed data strobe signal PDSD_p are applied to a phase detector 268, in the present example a latch 268, and the output of the detector is the up/down signal UP/DN which is indicative of a difference in phase between the pulsed write clock signal PWY and the internal pulsed data strobe signal PDSD_p. In one example, in a case where the up/down signal UP/DN is high, this indicates that the pulsed write clock signal PWY is leading the internal pulsed data strobe signal PDSD_p, and in a case where the up/down signal UP/DN is low, this indicates that the pulsed write clock signal PWY is lagging the internal pulsed data strobe signal PDSD_p. As described above, the up/down signal UP/DN is one example of a feedback signal 107 that is provided to the memory controller 102 to indicate phase difference between the write command signal and data strobe signal as received by each memory device, so that the memory controller can apply a compensation to the signals so that they are properly synchronized with each other at each of the memory devices 104 in the system.

According to the embodiments of the present invention, the feedback signal, in this case, the up/down UP/DN signal, is generated using signals that propagate along the same signal path in both the normal mode of operation, such as a write mode of operation, and the write leveling mode of operation. For this reason, a separate replica path for generating the feedback signal is not required, and a more accurate result can be achieved since a write leveling operation and an normal write operation use the same signal path.

At the same time, according to embodiments of the present invention, the phase comparison used for write leveling is made between a pulsed write command signal PWY generated based on the external write enable signal WEB, or write command signal received from the memory controller and the buffered internal pulsed data strobe signal PDSD_p of the data strobe signal DQS received from the memory controller. Since the received write enable WEB signal is synchronized with the received clock CLK signal, the write enable signal contains timing characteristics that are inherent in the clock signal CLK. Therefore, since the resulting pulsed write enable signal PWY, which is derived from the received write enable signal, is not continuously toggling, as does the clock signal CLK, the pulse width of the pulsed write enable signal PWY can be increased n times the period of the clock signal CLK. As a result, the data strobe signal DQS can be advanced and delayed by more than the former limitation of the conventional embodiments of 0.5 tCK in each direction, increasing the margin by which the timing of the data strobe signal DQS can be controlled. This feature expands the flexibility in achieving appropriate alignment between the data strobe DQS relative to the clock signal CLK, as clock frequencies continue to advance with further device integration, while overcoming the limitations associated with conventional approaches.

Figure 11:
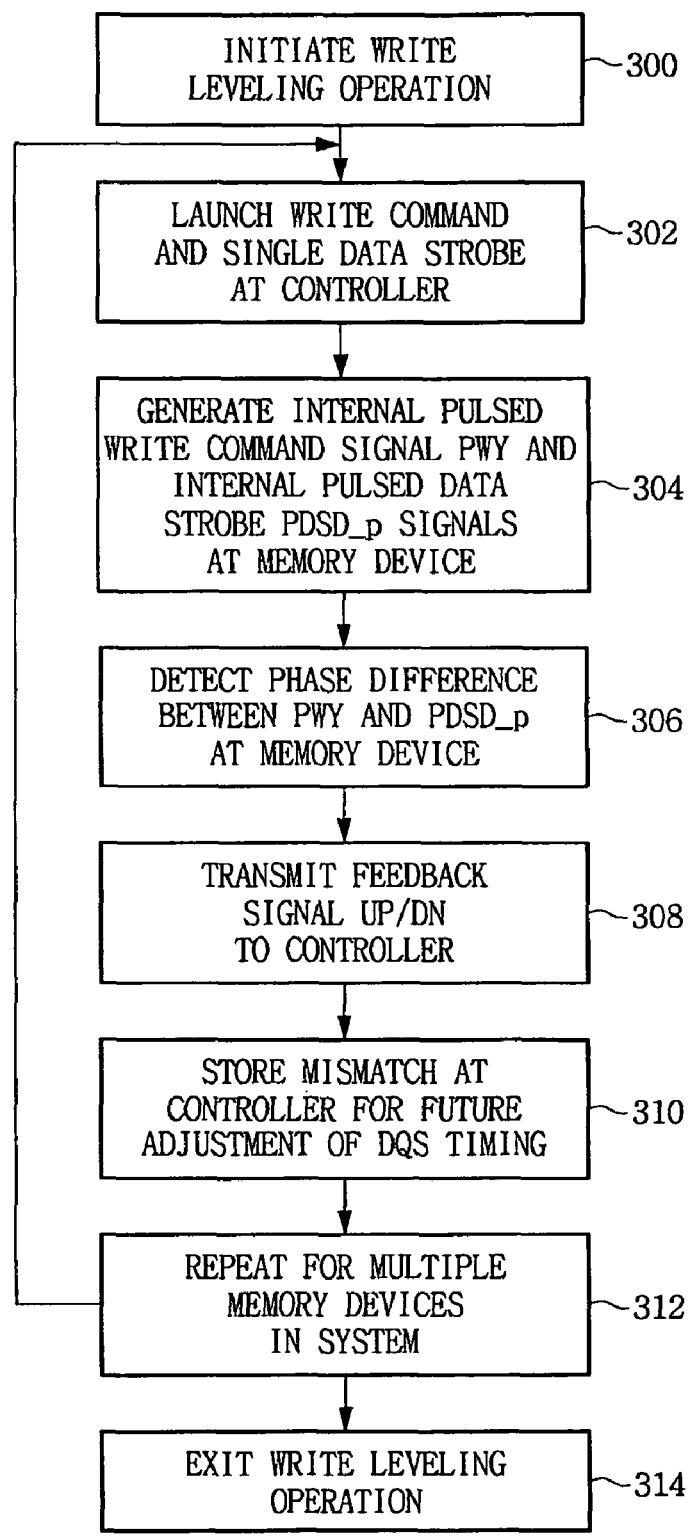
FIG. 11 is a flow diagram of a method of performing a write leveling operation, in accordance with an embodiment of the present invention.

FIG. 11 is a flow diagram of a method of performing a write leveling operation, in accordance with an embodiment of the present invention. At step 300, a mode register set operation is initiated so that the memory controller can determine the type of memory device that is connected to the memory controller, and so that a write leveling operation can be initiated. As described above, in alternative embodiments, the write leveling mode of operation can be initiated when the memory system exits a deep power down mode of operation, the write leveling mode of operation can be initiated periodically, the write leveling mode of operation can be initiated when a change in impedance or temperature is detected, or the write leveling mode of operation can be initiated by the memory device itself.

At step 302 a command signal for example, a write command signal, is generated by the controller, along with a data strobe signal. At step 304, the memory device receives the command and the data strobe signals, and generates an internal pulsed command signal for example, PWY and an internal pulsed data strobe signal PDSD_p respectively. At step 306, a phase difference between the command signal and PDSD_p signals is detected. At step 308 a feedback signal UP/DN is transmitted from the memory device to the controller that is indicative of the difference in phase between the command and PDSD_p signals. At step 310, a mismatch signal is stored in the controller, for the memory device, based on the feedback signal. The mismatch signal is used for future adjustment of the delay or advancement of the data strobe signal, relative to the clock signal and/or the command signal generated by the memory controller. At step 312, it is shown that this process can be repeated for multiple memory devices in the system. At step 312, the write leveling process is completed, and the mode of operation is changed, for example, to a normal mode of operation.

In an alternative embodiment to the method depicted in FIG. 11, the write leveling mode of operation can be initiated when the memory system exits a deep power down mode of operation. In other embodiments, for example in situations where some of the memory devices in the memory module have an abnormal amount of skew, the controller can repeat the write leveling process for a given memory device by changing the delay amount.

Figure 12A:
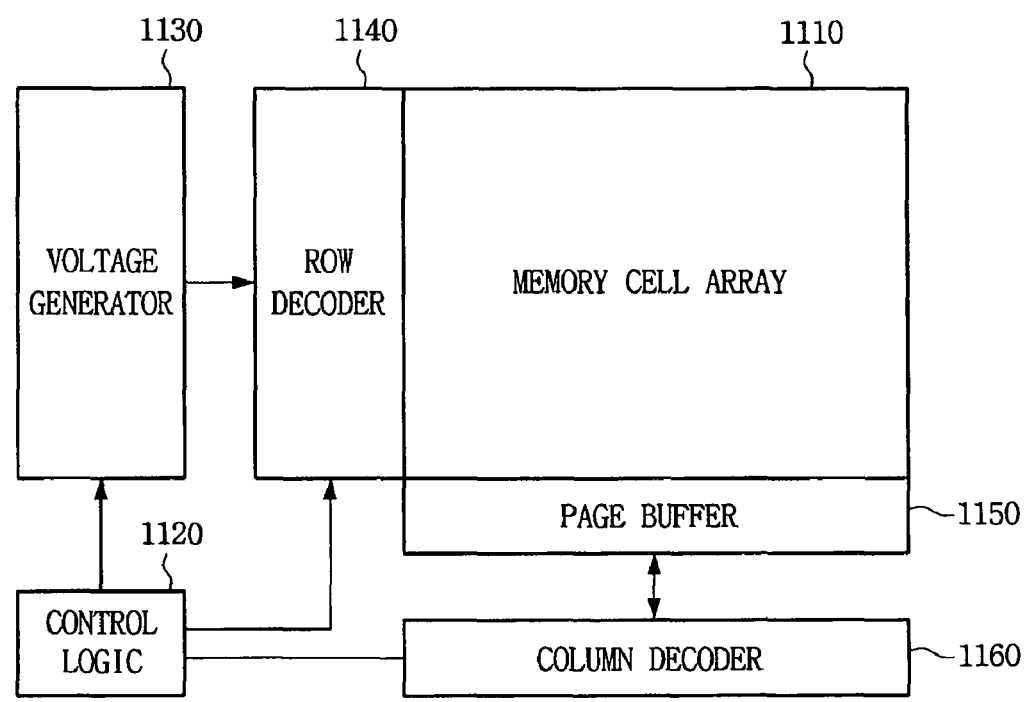
FIG. 12A is a block diagram of a memory device in accordance with embodiments of the present invention.

FIG. 12A is a block diagram of a memory device in accordance with embodiments of the present invention. A memory device 1100 includes a memory cell array 1110, control logic 1120, a voltage generator 1130, a row decoder 1140, a page buffer 1150, and a column decoder 1160. The memory cell array 1110 includes a plurality of memory cell strings 20A, 20B of the type described herein, optionally arranged in memory blocks. Control logic 1120 transmits control signals to the voltage generator 1130, the row decoder 1140 and the column decoder 1160 in accordance with the operation to be performed, for example, erase, programming, and read operations. The voltage generator 1130 generates the voltages such as Vpass, Vread, Verase, Vstep voltages required for performing the device operations. The row decoder 1140 determines the manner in which the voltage signals provided by the voltage generator are applied to the lines, such as string select lines SSL, word lines WLk, ground select lines GSL, and common source lines of the memory cell array 1110. The column decoder determines which signals of the bit lines BLn of the device read by the page buffer 1150 are to be used in determining data values that are read, or determines voltages that are applied to the bit lines BLn during programming and erase operations.

Figure 12B:
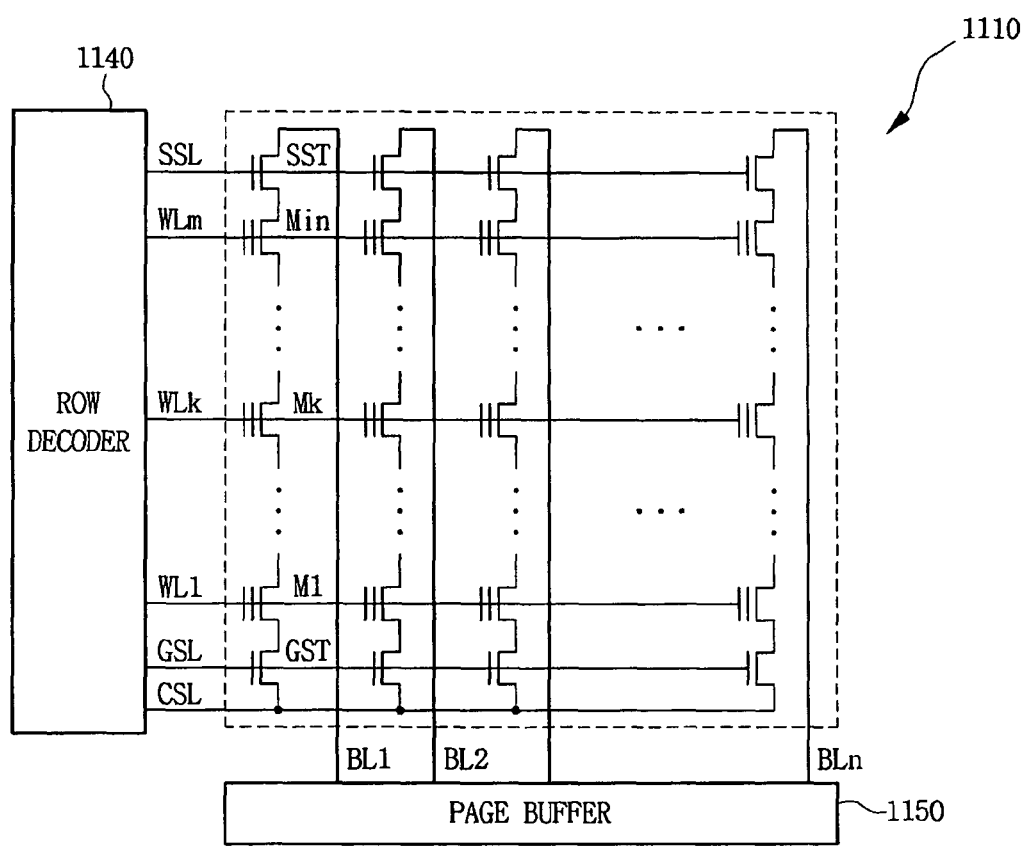
FIG. 12B is a block diagram of the memory cell array of the memory device of FIG. 12A, in accordance with embodiments of the present invention.

FIG. 12B is a block diagram of the memory cell array 1110, of the memory device 1100 of FIG. 12A, in accordance with embodiments of the present invention. In this figure it can be seen that the row decoder 1140 applies the various voltage levels to the one of or more string select lines SSL, the word lines WLk, the ground select line GSL, and the common source line CSL. The page buffer 1150 is connected to the bit lines BLn of the device 1110.

FIG. 13 is a block diagram of a memory card that includes a semiconductor device in accordance with the embodiments of the present invention. The memory card 1200 includes a memory controller 1220 that generates command and address signals C/A and a memory module 1210 for example, flash memory 1210 that includes one or a plurality of flash memory devices. The memory controller 1220 includes a host interface 1223 that transmits and receives command and address signals to and from a host, a controller 1224, and a memory interface 1225 that in turn transmits and receives the command and address signals to and from the memory module 1210. The host interface 1223, the controller 1224 and memory interface 1225 communicate with controller memory 1221 and processor 1222 via a common bus.

The memory module 1210 receives the command and address signals C/A from the memory controller 1220, and, in response, stores and retrieves data DATA I/O to and from at least one of the memory devices on the memory module 1210. Each memory device includes a plurality of addressable memory cells and a decoder that receives the receives the command and address signals, and that generates a row signal and a column signal for accessing at least one of the addressable memory cells during programming and read operations.

Each of the components of the memory card 1200, including the memory controller 1220, electronics 1221, 1222, 1223, 1224, and 1225 included on the memory controller 1220 and the memory module 1210 can employ memory devices and systems according to the inventive concepts disclosed herein.

Figure 14:
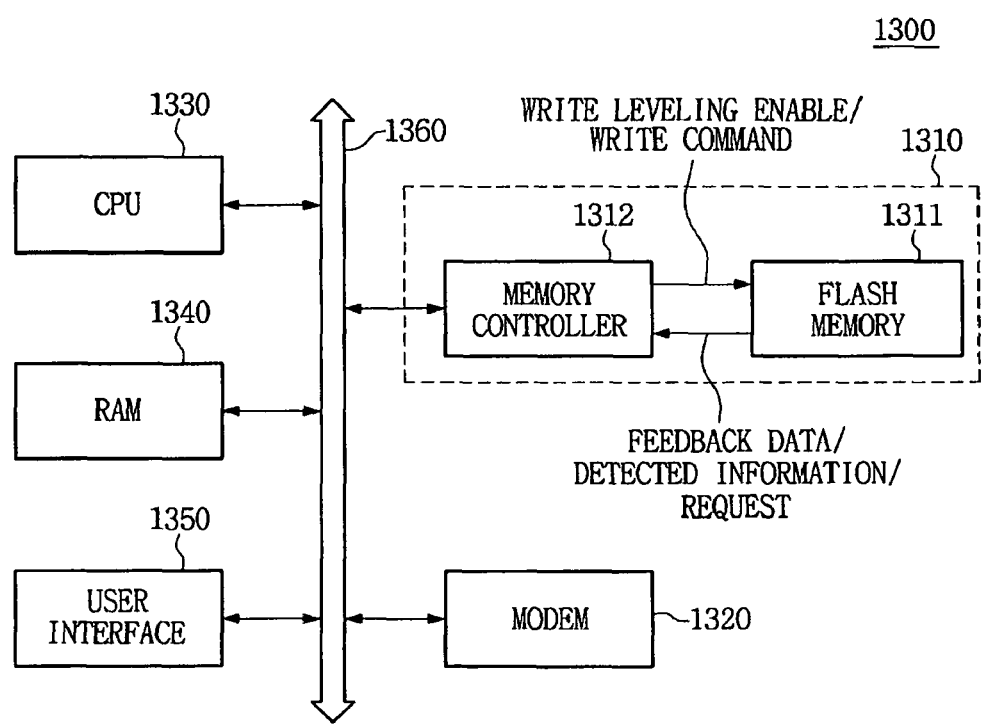
FIG. 14 is a block diagram of a memory system that employs a memory module, for example, of the type described herein, in accordance with the embodiments of the present invention.

FIG. 14 is a block diagram of a memory system 1300 that employs a memory module 1310, for example, of the type described herein. The memory system 1300 includes a processor 1330, random access memory 1340, user interface 1350 and modem 1320 that communicate via a common bus 1360. The devices on the bus 1360 transmit signals to and receive signals from the memory card 1310 via the bus 1360. Each of the components of the memory system 1300, including the processor 1330, random access memory 1340, user interface 1350 and modem 1320 along with the memory card 1310 can employ memory devices and systems of the type disclosed herein. The memory system 1300 can find application in any of a number of electronic applications, for example, those found in consumer electronic devices such as solid state disks (SSD), camera image sensors (CIS) and computer application chip sets.

The memory systems and devices disclosed herein can be packaged in any of a number of device package types, including, but not limited to, ball grid arrays (BGA), chip scale packages (CSP), plastic leaded chip carrier (PLCC) plastic dual in-line package (PDIP), multi-chip package (MCP), wafer-level fabricated package (WFP), and wafer-level processed stock package (WSP).

While embodiments of the invention have been particularly shown and described with references to preferred embodiments thereof, it will be understood by those skilled in the art that various changes in form and details may be made herein without departing from the spirit and scope of the invention as defined by the appended claims.

What is claimed is:

1. A method of controlling a memory device comprising:
generating a periodic clock signal for transmission to a memory device;
generating a data strobe signal for transmission to the memory device;
generating a command signal and a write leveling control signal for transmission to the memory device during operation in a write leveling mode of operation of the memory device;
receiving, from the memory device, a feedback signal, in response to the transmitted command signal and the transmitted data strobe signal, the feedback signal indicative of a difference in phase between the command signal and the data strobe signal, as received by the memory device, during operation in the write leveling mode of operation of the memory device; and
modifying timing of the generation of the data strobe signal relative to the periodic clock signal during a write operation in a normal mode of operation of the memory device based on the feedback signal.

2. The method of claim 1 wherein the command signal includes a write command signal.

3. The method of claim 1 wherein the command signal is a pulse signal.

4. The method of claim 1 wherein the write leveling mode of operation is initiated during a power-up sequence mode of operation or exit from a deep power-down mode of operation.

5. The method of claim 1 wherein the write leveling mode of operation is initiated periodically.

6. The method of claim 1 wherein the write leveling mode of operation is initiated periodically by at least one of the memory device and a memory device controller controlling the memory device.

7. The method of claim 1 wherein the write leveling mode of operation is initiated in response to at least one of a detected change in operating temperature and a detected change in impedance factors.

8. The method of claim 1 wherein the write leveling mode of operation is initiated in response to at least one of a detected change in operating temperature and a detected change in impedance factors, as detected by at least one of the memory device, a memory device controller controlling the memory device, and another system connected to the memory device or the memory device controller.

9. The method of claim 1 further comprising, during operation in the write leveling mode, storing timing information generated in response to the feedback signal, the timing information to be used for modification of timing of the generation of the data strobe signal relative to the clock signal during a write operation in the normal mode of operation of the memory device.

10. A write leveling method of a memory device, comprising:
receiving an external periodic clock signal from a memory device controller and, in response, generating an internal clock signal;
receiving an external command signal from the memory device controller, and, in response, generating an internal command signal that is synchronized with the internal clock signal;
receiving an external data strobe signal from the memory device controller and, in response, generating an internal data strobe signal;
detecting a difference in phase between the internal command signal and the internal data strobe signal; and
generating a feedback signal indicative of the difference in phase during the write leveling mode of operation.

11. The method of claim 10 wherein the command signal includes a write command signal.

12. The method of claim 10 wherein the command signal is a pulse signal.

13. The method of claim 10 further comprising transmitting the feedback signal to the memory device controller.

14. The method of claim 10 wherein the memory device further has a normal mode of operation and wherein the method further comprises, during operation in the normal mode of operation,
generating an internal write command signal and generating an internal data strobe signal that are used for inputting external data signals from a data signal bus to the memory device, the internal write command signal and the internal data strobe signal generated during the normal mode of operation having a same signal path as the internal write command signal and the internal data strobe signal generated during the write leveling mode of operation.

15. A memory device controller having a write leveling mode of operation, comprising:
a clock generator that generates a periodic clock signal for transmission to a memory device;
a data strobe generator that generates a data strobe signal for transmission to the memory device; and
a control unit that generates command signals for transmission to the memory device, the controller, during operation in the write leveling mode, generating a command signal and a write leveling control signal and transmitting the command signal and the write leveling control signal to the memory device.

16. The memory device controller of claim 15 wherein the command signal includes a write command signal.

17. The memory device controller of claim 15 wherein the command signal is a pulse signal.

18. The memory device controller of claim 15 wherein the write leveling mode of operation is initiated during a power-up sequence mode of operation or upon exit from a deep power-down mode of operation.

19. The memory device controller of claim 15 wherein the write leveling mode of operation is initiated periodically.

20. The memory device controller of claim 15 wherein the write leveling mode of operation is initiated periodically by at least one of the memory device and the memory device controller.

21. The memory device controller of claim 15 wherein the write leveling mode of operation is initiated in response to at least one of a detected change in operating temperature and a detected change in impedance factors.

22. The memory device controller of claim 15 wherein the write leveling mode of operation is initiated in response to at least one of a detected change in operating temperature and a detected change in impedance factors, as detected by at least one of the memory device, the memory device controller, and another system connected to the memory device or the memory device controller.

23. The memory device controller of claim 15 wherein the controller, during operation in the write leveling mode, receives a feedback signal from the memory device, in response to the transmitted command signal and the transmitted data strobe signal, the feedback signal indicative of a difference in phase between the command signal and the data strobe signal, as received by the memory device.

24. The memory device controller of claim 23 wherein the controller, during operation in the write leveling mode, stores timing information generated in response to the feedback signal, the timing information to be used for modification of timing of the generation of the data strobe signal relative to the clock signal during a write operation in a normal mode of operation of the controller.

25. A memory device having a write leveling mode of operation, comprising:
- a clock buffer that receives an external periodic clock signal from a memory device controller and generates an internal clock signal;
- a command signal decoder that receives an external command signal from the memory device controller, and, in response, generates an internal command signal that is synchronized with the internal clock signal;
- a data strobe buffer that receives an external data strobe signal from the memory device controller and generates an internal data strobe signal; and
- a phase detector unit that detects a difference in phase between the internal command signal and the internal data strobe signal, and generates a feedback signal indicative of the difference in phase during operation in the write leveling mode of operation.

26. The memory device of claim 25 wherein the command signal includes a write command signal.

27. The memory device of claim 25 wherein the command signal is a pulse signal.

28. The memory device of claim 25 wherein the feedback signal is transmitted by the memory device to the memory device controller.

29. The memory device of claim 25 wherein the memory device further has a normal mode of operation and wherein the memory device, during operation in the normal mode of operation, generates an internal write command signal and generates an internal data strobe signal that are used for inputting external data signals from a data signal bus to the memory device, the internal write command signal and the internal data strobe signal generated during the normal mode of operation having a same signal path as the internal write command signal and the internal data strobe signal generated during the write leveling mode of operation.

30. The memory device of claim 29 wherein the write command signal is a pulse signal.

31. A memory system comprising:
- a memory controller that generates command and address signals; and
- a memory module comprising a plurality of memory devices, the memory module receiving the command and address signals and in response storing and retrieving data to and from at least one of the memory devices,
wherein the memory controller has a write leveling mode of operation and comprises:
- a clock generator that generates a periodic clock signal for transmission to a memory device;
- a data strobe generator that generates a data strobe signal for transmission to the memory device; and
- a control unit that generates command signals for transmission to the memory device, the controller, during operation in the write leveling mode, generating a command signal and a write leveling control signal and transmitting the command signal and the write leveling control signal to the memory device.

32. The memory system of claim 31 wherein the command signal includes a write command signal.

33. The memory system of claim 31 wherein the command signal is a pulse signal.

* * * * *